United States Patent
Barker

(10) Patent No.: US 8,155,819 B2
(45) Date of Patent: Apr. 10, 2012

(54) SYSTEM AND METHOD FOR EFFECTING VEHICLE MANEUVER TO COMPENSATE FOR IMU ERROR

(75) Inventor: Michael A. Barker, Tuscon, AZ (US)

(73) Assignee: Raytheon Company, Waltham, MA (US)

( * ) Notice: Subject to any disclaimer, the term of this patent is extended or adjusted under 35 U.S.C. 154(b) by 1275 days.

(21) Appl. No.: 11/893,007

(22) Filed: Aug. 13, 2007

(65) Prior Publication Data

US 2011/0172854 A1  Jul. 14, 2011

(51) Int. Cl.
*G01M 17/00* (2006.01)
*G06F 7/00* (2006.01)
*G06F 19/00* (2006.01)
*G06F 11/30* (2006.01)
*G07C 5/00* (2006.01)

(52) U.S. Cl. ............ 701/29.2; 701/3; 701/4; 701/32.8; 701/13; 73/1.38; 73/1.77; 73/1.78; 73/652; 73/503.3; 244/3.2; 244/3.23; 244/164; 244/165; 244/194; 244/195

(58) Field of Classification Search .......... 701/4, 5, 701/8, 10, 29, 31, 35, 207, 220; 73/1.37, 73/1.38, 1.77, 1.78, 652, 125, 491, 503.3, 73/504.03, 504.13, 51, 2, 514.01; 244/3.15, 244/3.2, 3.21, 3.23, 3.28, 3.29, 164, 165, 244/75.1, 76 R, 175, 177, 180, 184, 194, 244/195

See application file for complete search history.

(56) References Cited

U.S. PATENT DOCUMENTS

| 4,730,793 | A | * | 3/1988 | Thurber et al. ............... 244/3.1 |
| 4,914,598 | A | * | 4/1990 | Krogmann et al. ............ 701/11 |
| 5,050,086 | A | * | 9/1991 | Lambregts ....................... 701/4 |
| 6,810,739 | B1 | * | 11/2004 | Campbell et al. .......... 73/514.01 |
| 6,908,064 | B2 | * | 6/2005 | Goodzeit et al. ............. 244/169 |
| 7,137,208 | B2 | * | 11/2006 | Campbell et al. .......... 33/366.13 |
| 2006/0060692 | A1 | * | 3/2006 | Yehezkeli et al. .......... 244/3.21 |

* cited by examiner

*Primary Examiner* — Jack W Keith
*Assistant Examiner* — Rami Khatib
(74) *Attorney, Agent, or Firm* — Schwegman, Lundberg & Woessner, P.A.

(57) ABSTRACT

The effects of IMU gyro and accelerometer bias errors are significantly reduced in accordance with the present teachings by a system or method for commanding an IMU or vehicle through a series of preprogrammed maneuvers. The maneuvers can be designed to minimize the effects of other gyro errors including scale factor errors, nonlinearities, cross coupling/misalignment, and scale factor asymmetries. A sample maneuver is provided which demonstrates performance based on a sequence of roll and yaw maneuvers resulting in zero build up of error at the end of a maneuver cycle period as a result of these errors. Modification of the system involves the addition of control logic to determine the maneuver period, maneuver rate, and vehicle orientation. No additional hardware beyond possible fuel required to perform the maneuver is required.

24 Claims, 3 Drawing Sheets

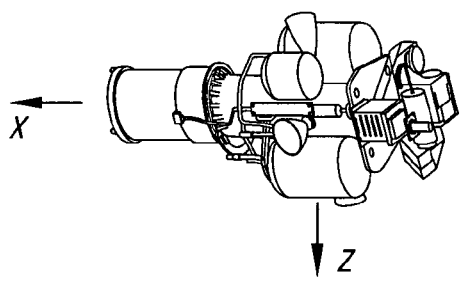
FIG. 3a
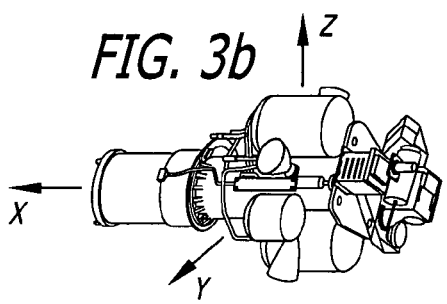
FIG. 3b
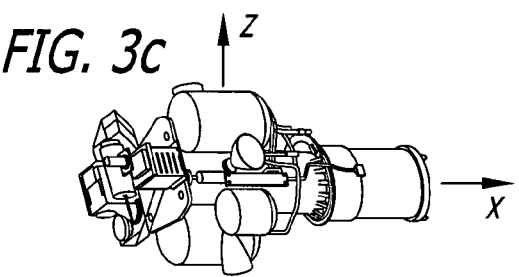
FIG. 3c
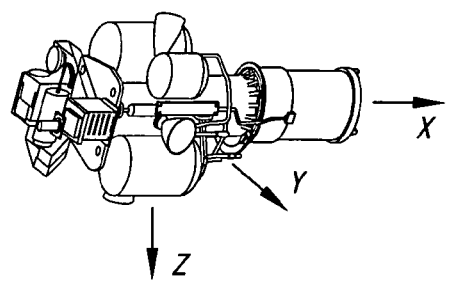
FIG. 3d
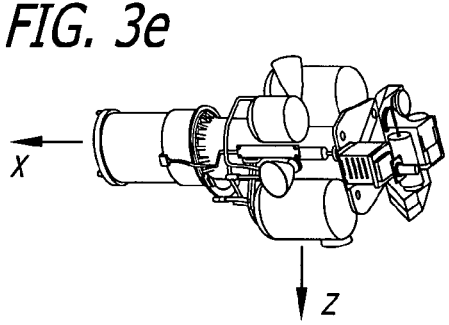
FIG. 3e
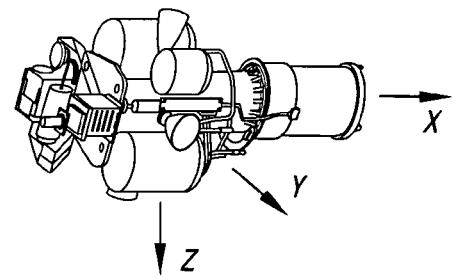
FIG. 3f
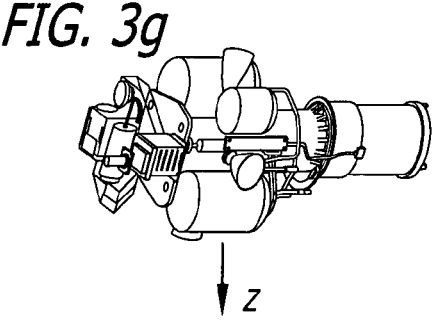
FIG. 3g
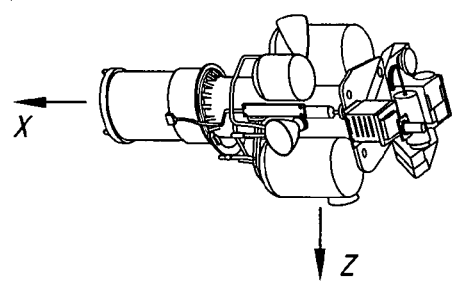
FIG. 3h
FIG. 3i

SYSTEM AND METHOD FOR EFFECTING VEHICLE MANEUVER TO COMPENSATE FOR IMU ERROR

BACKGROUND OF THE INVENTION

1. Field of the Invention

The present invention relates to systems and methods for detecting position and/or orientation of a vehicle. More specifically, the present invention relates to systems and methods for minimizing error in inertial measurement units.

2. Description of the Related Art

Accidental or unauthorized attacks by nuclear-capable nations or attacks by rogue nations or terrorist groups, currently represent significant national security concerns. For this reason, a 'layered' missile defense has been recognized as being needed to protect U.S. and allied forces, as well as the U.S. homeland, from long-range, medium-range, and short-range air and missile attack.

Three segments are currently under development to support such a 'layered' defense: Boost Phase Defense, Midcourse Defense, and Terminal Defense. An element of the Midcourse Defense segment is Ground-based Midcourse Defense (GMD). The GMD is being designed and developed to protect all 50 U.S. states against limited ballistic missile attack by intercepting long-range ballistic missiles during the midcourse or ballistic phase of their flight, before their reentry into the earth's atmosphere.

The Raytheon kill vehicle represents a critical piece of the GMD program. The kill vehicle is the intercept component of the Ground-Based Interceptor (GBI) that includes a government choice of a booster. Its mission is to provide protection against small-scale missile attacks. Specifically, its niche in defense of the nation is to engage high-speed ballistic missile warheads, otherwise known as reentry vehicles, in the midcourse or exo-atmospheric phase of their trajectories and destroy them using only force of impact.

The Exo-atmospheric Kill Vehicle (EKV) is the intercept component of the Ground Based Interceptor (GBI), the weapon element of the Ground-based Midcourse Defense System. Its mission in the defense of the nation is to engage high-speed ballistic missile warheads in the midcourse phase of flight and to destroy them using only the force of impact or hit-to-kill.

The Exo-atmospheric Kill Vehicle (EKV) consists of an infrared sensor in a flight package used to detect and discriminate the reentry vehicle (incoming warhead) from other objects. The sensor includes a multiple-waveband infrared seeker that it uses to acquire and track targets. This seeker is comprised of focal plane arrays and a cryogenic cooling assembly attached to an optical telescope, supported by hardware and software processing. In addition to having an infrared seeker, the EKV has its own propulsion, communication link, discrimination algorithms, guidance and control system, and computers to support target selection and intercept decisions in the final seconds, or end game, of its flight.

The 'hit-to-kill' concept involves colliding with the incoming warhead, completely pulverizing it. This high-speed collision is intended to ensure complete destruction of a warhead carrying nuclear, biological or chemical weapons of mass destruction and the means of delivery, such as mid-range and long-range ballistic missiles. However, this high-speed collision requires accurate guidance and control. This is problematic inasmuch as the guidance is to be effected using an inertial measurement unit (IMU). Unfortunately, IMUs accumulate error over time. These errors affect the accuracy of the vehicle. That is, these errors limit the time of flight of exo-atmospheric vehicles.

To achieve longer exo-atmospheric flight times in accordance with conventional teachings, an IMU with low accelerometer and gyro biases is required to minimize errors in position, velocity, and attitude. However, such low bias IMUs can increase the cost of the system on the order of several hundreds of thousands of dollars. Further, even with these IMUs, velocity errors on the order of 10 m/s, position errors on the order of 5 km, and attitude error of 24 mrad can occur.

In the case of gyros, these errors are often compensated by the addition of stellar measurements, typically requiring a visible star sensor or stellar compass. However, the additional weight of these sensors can decrease system performance and increase cost considerably as well.

Hence, a need remains in the art for a system or method for increasing the accuracy of inertial measurement units used for exo-atmospheric and other high speed vehicles without substantially increasing the cost and/or weight thereof.

SUMMARY OF THE INVENTION

The need in the art is addressed by the guidance system and method of the present invention. In the most general embodiment, the inventive guidance system includes an arrangement for detecting a rate of change of attitude and velocity of a vehicle or inertial measurement unit (IMU) in motion. If the IMU has an error associated therewith, the system is adapted to issue a command to execute one or more maneuvers to mitigate the error.

In the best mode, the guidance system includes means for commanding the vehicle to execute maneuvers to substantially null the error. The error may be inertial measurement unit bias error or one or more gyro errors including a scale factor error, nonlinearity, cross coupling/misalignment, and/or scale factor asymmetry.

The IMU includes sensors for measuring changes in vehicle orientation. A navigation subsystem is included for determining vehicle attitude and position responsive to the IMU and providing an orientation estimate in response thereto. A guidance subsystem determines a required vehicle orientation and provides a commanded orientation in response thereto. An attitude control processing subsystem provides desired vehicle attitude control commands in response to the orientation estimate and the commanded orientation. An attitude control system then orients the vehicle based on the attitude control commands.

In the illustrative embodiment, the system commands the vehicle to execute a sequence of maneuvers effective to mitigate the error of the IMU. Given a vehicle with first, second and third mutually orthogonal body axes, an illustrative maneuver sequence includes a +180° rotation about the first axis, a +180° rotation about the second axis, a +180° rotation about the first axis, a +180° rotation about the second axis, a +180° rotation about the second axis, a +180° rotation about the first axis, a +180° rotation about the second axis, and a then +180° rotation about the first axis. In the illustrative embodiment, the first and second axes are the roll and yaw axes of the vehicle.

Hence, by performing an appropriate set of maneuvers the errors due to IMU gyro and accelerometer bias, and gyro scale factor, misalignment, and non-orthogonality can be periodically cancelled allowing for a significant increase attitude, position, and velocity accuracy.

In a first alternative embodiment, the maneuvers are designed to minimize fuel consumption associated with guidance of the vehicle. In a second alternative embodiment, the maneuvers are designed to minimize a solar, lunar or planetary factor.

BRIEF DESCRIPTION OF THE DRAWINGS

FIGS. 3*a-i* show a vehicle in various positions in a maneuver sequence in accordance with an illustrative embodiment of the present teachings.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The effects of IMU gyro and accelerometer bias errors are significantly reduced in accordance with the present teachings by commanding an IMU or vehicle through a series of preprogrammed maneuvers.

By rotating the vehicle during free flight bias errors can be periodically cancelled. The maneuvers can be designed to minimize the effects of other gyro errors including scale factor errors, nonlinearities, cross coupling/misalignment, and scale factor asymmetries.

Figure 1:
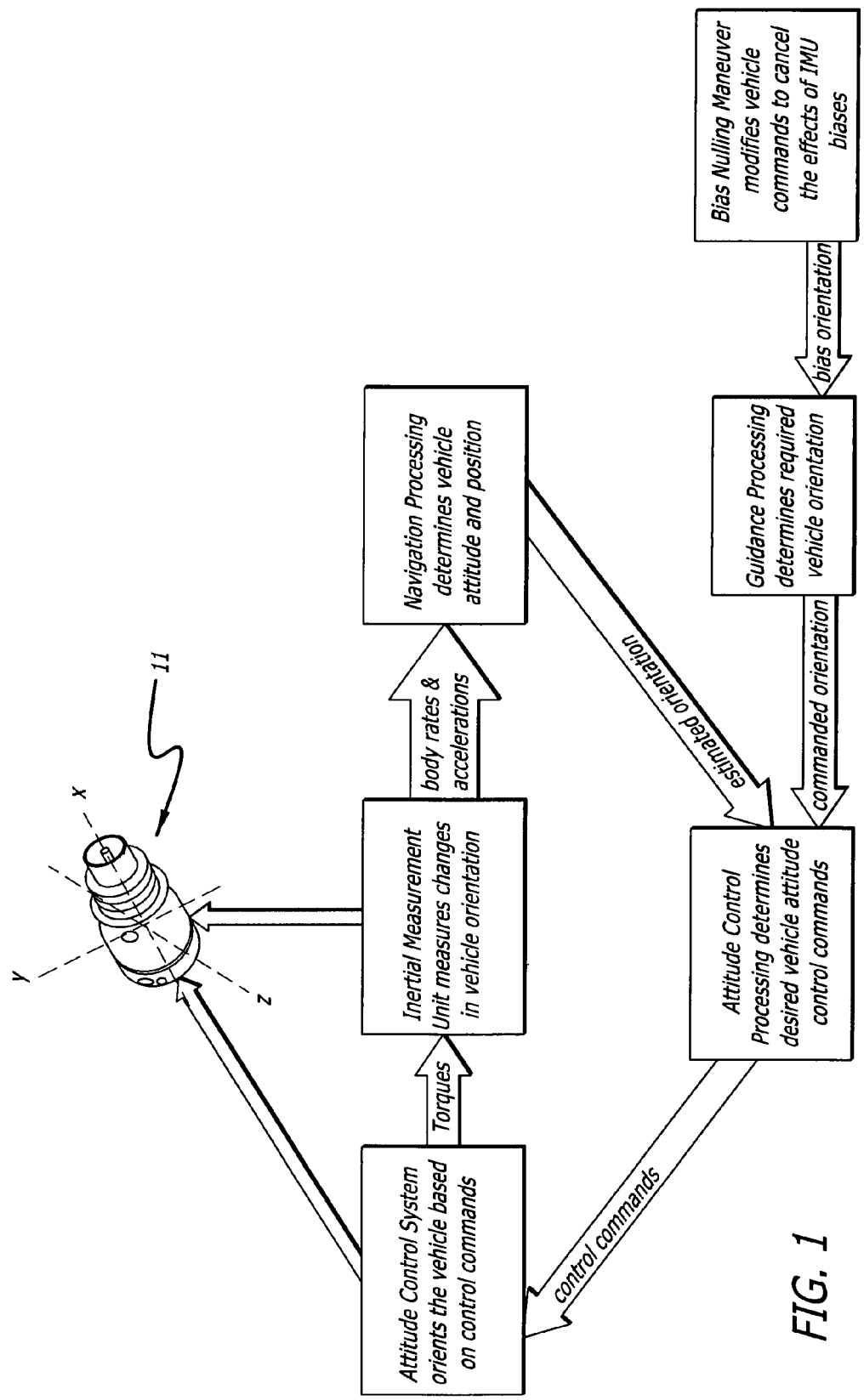
FIG. 1 is a functional diagram which illustrates the operation of the invention in accordance with an illustrative embodiment thereof.

Consider a 360 deg roll, at the end of the roll the integral of the pitch and yaw gyro biases and the Y and Z-axis accelerometer biases in inertial space will be zero resulting in no increase in attitude or velocity errors. While compensating for biases, such rotations introduce other errors due to gyro scale factor, misalignment and non-orthogonality. Hence, the errors to be considered include:

$$\text{bias} = \int T_b^i \begin{bmatrix} b_x \\ b_y \\ b_z \end{bmatrix} dt, \quad [1]$$

$$\text{scale factor} = \int T_b^i \begin{bmatrix} k_x & 0 & 0 \\ 0 & k_y & 0 \\ 0 & 0 & k_z \end{bmatrix} \Omega dt \quad [2]$$

$$\text{misalignment} = \int T_b^i \begin{bmatrix} 0 & \psi_m & -\theta_m \\ -\psi_m & 0 & \varphi_m \\ \theta_m & -\varphi_m & 0 \end{bmatrix} \Omega dt, \quad [3]$$

$$\text{nonorthogonality} = \int T_b^i \begin{bmatrix} 0 & \psi_n & \theta_n \\ \psi_n & 0 & \varphi_n \\ \theta_n & \varphi_n & 0 \end{bmatrix} \Omega dt \quad [4]$$

where $\Omega$ vehicle body rate;
$T_b^i$=body-to-inertial transformation matrix;
$\theta$=pitch angle
$\varphi$=roll angle
$\psi$=yaw angle
b=body coordinate frame
i=inertial coordinate frame
n=nonorthogonality error
m=misalignment error
x=roll body axis
y=pitch body axis
z=yaw body axis FIG. 1 is a functional diagram which illustrates the operation of the invention in accordance with an illustrative embodiment thereof.

Figure 2:
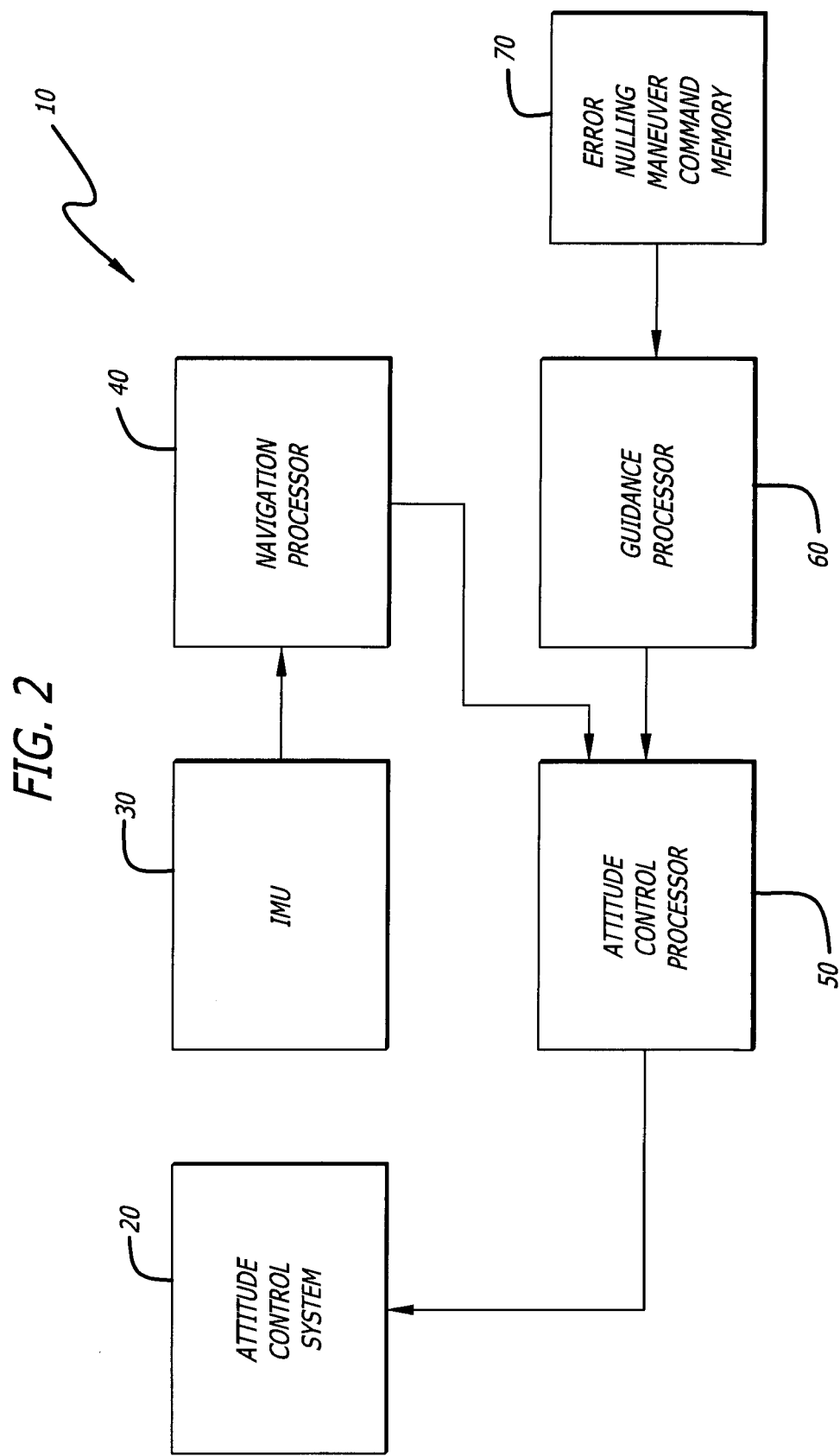
FIG. 2 is a block diagram of a guidance system implemented in accordance with an illustrative embodiment of the present teachings.

FIG. 2 is a block diagram of a guidance system implemented in accordance with an illustrative embodiment of the present teachings. As illustrated in FIGS. 1 and 2, the system 10 includes an attitude control system 20 that orients a vehicle 11 based on control commands. In the case of a satellite, the attitude control system 20 may include thrusters (not shown) adapted to rotate the vehicle about three mutually orthogonal (x, y, z) axes. In accordance with convention, the x-axis is the roll axis, the y-axis is the pitch axis and the z-axis is the yaw axis. The attitude control system applies torques to the vehicle 11. Onboard the vehicle 11 is an inertial measure unit 30 (not shown in FIG. 1). The IMU 30 is fitted with sensors to measure linear accelerations and angular rates along and about the roll, pitch and yaw axes of the vehicle 11 and provide signals with respect thereto to a navigation processor 40. The navigation processor 40 utilizes the signals from the IMU 30 to determine the actual vehicle attitude and position. The navigation processor 40 outputs an estimate of the vehicle orientation and position to an attitude control processor 50. A guidance processor 60 determines a required vehicle orientation in accordance with mission objectives and provides a commanded orientation in response thereto. The processors 40, 50 and 60 may be implemented with general purpose microprocessors, special purpose microprocessors, application specific integrated circuits, discrete logic, gate arrays or other means known in the art without departing from the scope of the present teachings. In the best mode, a general-purpose microprocessor is used for the guidance processor 60 programmed with software described more fully below.

In accordance with conventional teachings, the attitude control processor 50 outputs control commands to the attitude control system 20 in response to a commanded orientation from the guidance processor 60 and the orientation estimate from the navigation processor 40. However, in accordance with the present teachings, an error nulling maneuver command memory 70 outputs error nulling maneuver commands to the guidance processor 60. As discussed more fully below, the error nulling maneuver commands are formulated to modify the vehicle commands to cancel the effects of IMU biases.

As noted above, the present teachings may be implemented to effect the error nulling maneuvers on the IMU directly without translation of the maneuver inducing torques to the body of the vehicle 11.

Processing in the guidance processor 60 is modified to include the addition of the bias nulling commands. Thus if the existing commands are $\varphi_c(t)$, $\theta_c(t)$, and $\psi_c(t)$, and the bias nulling commands are $\varphi_{bn}(t)$, $\theta_{bn}(t)$, and $\psi_{bn}(t)$ then the modified commands will be:

$$\varphi(t)'=\varphi(t)+\varphi_{bn}(t)$$

$$\theta(t)'=\theta(t)+\theta_{bn}(t) \quad [5]$$

$$\psi(t)'=\psi(t)+\psi_{bn}(t)$$

where the bias nulling commands are determined as described below.

An illustrative IMU error nulling maneuver sequence in accordance with an illustrative embodiment of the present teachings is shown in FIGS. 3a-i below.

FIGS. 3a-i show a vehicle in various positions in a maneuver sequence in accordance with an illustrative embodiment of the present teachings. Given a vehicle with first, second and third mutually orthogonal body axes, in the illustrative embodiment, the roll, yaw and pitch axes respectively, an illustrative maneuver sequence beginning at an arbitrary initial orientation (FIG. 3a) includes a +180° rotation about the first axis (FIG. 3b), a +180° rotation about the second axis (FIG. 3c), a +180° rotation about the first axis (FIG. 3d), a +180° rotation about the second axis (FIG. 3e), a +180° rotation about the second axis (FIG. 3f), a +180° rotation about the first axis (FIG. 3g), a +180° rotation about the second axis (FIG. 3h), and a then +180° rotation about the first axis (FIG. 3i).

The period for the maneuver sequence may be adjusted to complete the maneuver in a specified time or to limit the body rate.

Hence, by performing an appropriate set of maneuvers, errors due to IMU gyro and accelerometer bias, and gyro scale factor, misalignment, and non-orthogonality can be periodically cancelled allowing for a significant increase in attitude, position, and velocity accuracy.

In addition, the maneuver sequence may be designed to minimize the fuel used to perform the maneuver and/or maintain the rotations in a plane to minimize issues of solar, lunar, and earth limb avoidance.

The eight segment case illustrated in FIG. 4 is optimal in the sense that errors due to bias, scale factor, misalignments, non-linearities, and non-orthogonalities are all cancelled at the end of the sequence with a minimum in the error build up during the sequence. Other discrete sequences are possible including:

☐ +180° roll, +180° roll, +180° yaw, +180° roll, +180° yaw, +180° yaw, +180° roll, +180° yaw ☐ +180° roll, +180° yaw, +180° roll, +180° roll, +180° yaw, +180° roll, +180° yaw, +180° yaw ☐ +180° roll, +180° yaw, +180° yaw, +180° roll, +180° yaw, +180° roll, +180° roll, +180° yaw In the illustrative embodiment, these maneuver sequences consist of discrete segments of constant rotation. However, those of ordinary skill in the art will appreciate that a sequence consisting of a continuous change in the body rates is within the scope of the present invention.

The maneuver sequence may be performed cyclically and the period can be adjusted by selecting the slew rate. Further, interruptions of a sequence can occur. Errors will build up during this time, however if the duration is short, the errors should be small. Ideally the attitude path taken during the interruption is inverted in the return to the maneuver sequence.

In a first alternative embodiment, the maneuvers are designed to minimize fuel consumption associated with guidance of the vehicle. In a second alternative embodiment, the maneuvers are designed to minimize a solar, lunar and/or planetary factor.

Thus, the present invention has been described herein with reference to a particular embodiment for a particular application. Those having ordinary skill in the art and access to the present teachings will recognize additional modifications applications and embodiments within the scope thereof. Modification of the system involves the addition of control logic to determine the maneuver period, maneuver rate, and vehicle orientation. No additional hardware beyond possible fuel required to perform the maneuver is required.

It is therefore intended by the appended claims to cover any and all such applications, modifications and embodiments within the scope of the present invention.

Accordingly,

What is claimed is:

1. A guidance system comprising:
an inertial measurement unit (IMU) configured to detect a rate of change with respect to a velocity vector of a vehicle in motion, the IMU having bias error; and
a guidance processor configured to command the vehicle to execute a pre-programmed maneuver sequence to mitigate effects of the bias error with bias nulling commands from an error nulling maneuver command memory.

2. The guidance system of claim 1 wherein the bias error is at least one of an inertial measurement unit bias error or a gyro error.

3. The guidance system of claim 2, wherein the gyro error can include at least one a scale factor error, nonlinearity, cross coupling/misalignment, or scale factor asymmetry.

4. The guidance system of claim 1 wherein said IMU includes sensors configured to measure changes in vehicle orientation.

5. The guidance system of claim 4 further including a navigation processor means responsive to said IMU configured to determine vehicle attitude and position and providing an orientation estimate in response thereto.

6. The guidance system of claim 5 wherein the guidance processor is configured to determine a required vehicle orientation and provide a commanded orientation in response thereto.

7. The guidance system of claim 6 further including an attitude control processor responsive to said orientation estimate and said commanded orientation and configured to determine desired vehicle attitude control commands, 8. The guidance system of claim 7 further including an attitude control system configured to orient said vehicle based on said attitude control commands.

9. The guidance system of claim 1 wherein said vehicle has first, second and third mutually orthogonal body axes.

10. The guidance system of claim 9 wherein said sequence includes +180° rotation about the first axis, +180° rotation about the second axis, +180° rotation about the first axis, +180° rotation about the second axis, +180° rotation about the second axis, +180° rotation about the first axis, +180° rotation about the second axis, and a +180° rotation about the first axis.

11. The guidance system of claim 10 wherein the first and second axes are the roll and yaw axes respectively.

12. A guidance system comprising:
an inertial measurement unit (IMU) configured to detect a rate of change with respect to a velocity vector of a vehicle in motion, said having an error; and
a guidance system configured to command said vehicle to execute one or more maneuvers to mitigate said error with commands from memory.

13. The guidance system of claim 12 wherein said error is at least one of an inertial measurement unit bias error or a gyro error.

14. The guidance system of claim 13, wherein the gyro error can include at least one a scale factor error, nonlinearity, cross coupling/misalignment, or scale factor asymmetry.

15. The guidance system of claim 12 wherein said guidance system includes means for commanding said vehicle to execute the one or more maneuvers to mitigate effects of the error with bias nulling commands from an error nulling maneuver command memory.

16. The guidance system of claim 12 wherein said IMU includes sensor means for measuring changes in vehicle orientation.

17. The guidance system of claim 16 further including navigation means responsive to said IMU for determining vehicle attitude and position and providing an orientation estimate in response thereto.

18. The guidance system of claim 17 further including guidance means responsive to said second means for determining a required vehicle orientation and providing a commanded orientation in response thereto.

19. The guidance system of claim 18 further including attitude control processing means responsive to said orientation estimate and said commanded orientation for determining desired vehicle attitude control commands.

20. The guidance system of claim 19 further including an attitude control system configured to orient said vehicle based on said attitude control commands.

21. The guidance system of claim 12 wherein said guidance system includes means for commanding said vehicle to execute the one or more maneuvers effective to mitigate said error of the IMU.

22. The guidance system of claim 21 wherein said vehicle has first, second and third mutually orthogonal body axes.

23. The guidance system of claim 22 wherein said sequence includes +180° rotation about the first axis, +180° rotation about the second axis, +180° rotation about the first axis, +180° rotation about the second axis, +180° rotation about the second axis, +180° rotation about the first axis, +180° rotation about the second axis, and a +180° rotation about the first axis.

24. The guidance system of claim 23 wherein the first and second axes are the roll and yaw axes respectively.

* * * * *

UNITED STATES PATENT AND TRADEMARK OFFICE
CERTIFICATE OF CORRECTION

| | | |
|---|---|---|
| PATENT NO. | : 8,155,819 B2 | Page 1 of 1 |
| APPLICATION NO. | : 11/893007 | |
| DATED | : April 10, 2012 | |
| INVENTOR(S) | : Michael A. Barker | |

It is certified that error appears in the above-identified patent and that said Letters Patent is hereby corrected as shown below:

On the Title page, in item (75), in "Inventor", in column 1, line 1, delete "Tuscon, AZ" and insert -- Tucson, AZ --, therefor.

In the Claims

In column 6, line 43, in Claim 7, delete "commands," and insert -- commands. --, therefor.

In column 6, line 61, in Claim 12, delete "said having" and insert -- said IMU having --, therefor.

Signed and Sealed this
Twenty-ninth Day of September, 2015

Michelle K. Lee
*Director of the United States Patent and Trademark Office*